United States Patent
Mazzara, Jr. et al.

(10) Patent No.: US 11,500,993 B2
(45) Date of Patent: Nov. 15, 2022

(54) CONTINGENT AUTHENTICATED BOOT OF AN ELECTRONIC CONTROL UNIT

(71) Applicants: William Mazzara, Jr., Waterford, MI (US); Adam Brackmann, Birmingham, MI (US)

(72) Inventors: William Mazzara, Jr., Waterford, MI (US); Adam Brackmann, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 213 days.

(21) Appl. No.: 16/534,465

(22) Filed: Aug. 7, 2019

(65) Prior Publication Data
US 2021/0042419 A1 Feb. 11, 2021

(51) Int. Cl.
*G06F 21/57* (2013.01)
*G06F 9/445* (2018.01)

(52) U.S. Cl.
CPC ............ *G06F 21/575* (2013.01); *G06F 9/445* (2013.01); *G06F 21/572* (2013.01)

(58) Field of Classification Search
CPC ...... G06F 21/575; G06F 9/445; G06F 21/572; G06F 9/4406
See application file for complete search history.

(56) References Cited

U.S. PATENT DOCUMENTS

| | | | |
|---|---|---|---|
| 8,386,763 B1* | 2/2013 | Spangler ............... | G06F 9/4401 713/2 |
| 2008/0215872 A1* | 9/2008 | Choi ..................... | G06F 21/575 713/2 |
| 2009/0170473 A1* | 7/2009 | Bauernfeind ......... | G06F 9/4406 455/411 |
| 2015/0006873 A1* | 1/2015 | Klein .................... | G06F 21/575 713/2 |

* cited by examiner

*Primary Examiner* — Jaweed A Abbaszadeh
*Assistant Examiner* — Hyun Soo Kim
(74) *Attorney, Agent, or Firm* — Ralph E. Smith

(57) ABSTRACT

One or more ECU's in an automotive vehicle have a contingent boot and an authenticated boot. When each such ECU is initialized, that ECU performs the contingent boot and the authenticated boot in parallel. The authenticated boot authenticates operational firmware for that ECU that is stored in flash memory of that ECU, starting with initial firmware of the operational firmware. Contingent boot firmware is stored in flash memory of the ECU or is stored in essentially non-alterable memory of the ECU. The contingent boot executes the ECU contingent boot firmware for that ECU. The contingent boot firmware has limited functionality and does not have the ability to flash the flash memory. Upon successful authentication of the initial firmware, the ECU executes the initial firmware and terminates the contingent boot.

8 Claims, 2 Drawing Sheets

CONTINGENT AUTHENTICATED BOOT OF AN ELECTRONIC CONTROL UNIT

The present invention relates to automotive vehicles having electronic control units, and more particularly, to a contingent authenticated boot for any of the electronic control units.

BACKGROUND

Modern automotive vehicles typically have a number of electronic control units, referred to herein as ECU's, that are coupled to one or more data communication buses of the vehicle, which are typically controller area network ("CAN") buses. As is known in the art, CAN is a multi-master serial bus standard for connecting electronic devices, typically ECU's, which are also known as nodes. When a vehicle is started, the norm is for the ECU's to boot during which each ECU begins executing the applicable executable code from non-volatile memory of the ECU. In many cases, the ECU loads an operating system during boot. This executable code stored in non-volatile memory is commonly referred to as firmware. It should be understood that in some cases, which are the exceptions, there are ECU's that do not need to boot when the vehicle is started, such as an ECU that remains in a booted state when the vehicle is turned off, or an ECU that only boots upon occurrence of a particular event after the vehicle is started.

Firmware for ECU's in automotive vehicles typically includes executable code for the operating system and applications that the ECU's execute, parsable scripts and configuration and calibration files.

The non-volatile memory in which the firmware is stored is typically re-programmable so that the executable code can be updated if needed by re-programming the non-volatile memory with the updated executable code, a process typically referred to as flashing the non-volatile memory as the non-volatile memory is often referred to in the art as flash memory and will be referred to herein as flash memory. Since the flash memory is alterable, to maintain trust in an ECU's correct functionality upon vehicle startup, the firmware for that ECU must not have been modified other than by an authorized firmware update process. Thus, it is becoming the practice to have security critical ECUs within a vehicle test the authenticity of their respective firmware for that ECU before executing, or booting that firmware. This process, sometimes referred to as an authenticated boot, will detect and prevent execution of firmware modified by any means other than an authorized firmware update process.

An authenticated boot is based on the assumption that the initial firmware of an ECU boots (or is reinitialized) every ignition cycle. The initial firmware is for example a first layer of the applicable firmware that upon initialization, triggers a boot chain of the remaining applicable layers of the firmware. ECUs which do not initialize or boot every ignition cycle must define a re-initialization strategy appropriate for the ECU design, such as by way of example and not of limitation, having a re-initialization or boot that occurs periodically during a period of continuous operation, such as once every twelve hour period of continuous operation. Cryptography is typically used for authenticated boot, for example where a digital signature appended to the firmware being loaded is verified across the firmware by using a public key protected by a hardware trust anchor in the ECU and a cryptographic signature scheme, such as cryptographic signature schemes known in the art. The time it takes the authenticated boot to complete is dependent on the size of the firmware being authenticated. The larger the size of the firmware, the longer the authenticated boot takes to complete. In some cases, this time may exceed the boot time performance specification for the applicable ECU. It would thus be desirable to have a boot process for large size firmware that allows the firmware to be authenticated and the applicable ECU meet its boot time specification. As is understood in the art, a boot time specification for an ECU is the time by which that ECU must have booted to meet operational requirements for that ECU. As is understood in the art, the boot time specification for a ECU is dependent on the application for which the ECU is used. Certain types of applications, such as engine control applications, require a shorter boot time than other types of applications, such as entertainment applications.

Firmware may be divided into as many logical partitions, referred to herein as layers, and tested in parts to achieve operational performance criteria. In such cases, execution of successfully authenticated layers of firmware is permitted while subsequent layers are being authenticated.

SUMMARY

In accordance with an aspect of the present disclosure, one or more ECU's in an automotive vehicle have a contingent boot and an authenticated boot. When each such ECU is initialized, that ECU executes the contingent boot and the authenticated boot in parallel. The authenticated boot authenticates operational firmware for that ECU that is stored in flash memory of that ECU, starting with initial firmware of the operational firmware. The contingent boot executes contingent boot firmware stored in memory of the ECU. The contingent boot firmware has limited functionality and does not have the ability to flash the flash memory of the ECU. Upon completion of the authenticated boot of the initial firmware of the operational firmware, the ECU begins executing the initial firmware of the operational firmware and discontinues execution of the contingent boot firmware.

In an aspect, the contingent boot firmware has functionality that is limited to the ECU sending within a predetermined period of time a message onto a data communication bus to which the electronic control unit is coupled.

In any of the foregoing aspects or any combination thereof, the contingent boot firmware is executed without authenticating the contingent boot firmware.

In any aspect of the foregoing aspects or any combination thereof, the initial firmware of the operational firmware is code for a first layer of the operational firmware that includes only code necessary for loading and authentication of subsequent layers of the operational firmware.

In any aspect of the foregoing, the memory of the ECU in which the contingent boot firmware is stored is the flash memory. In another aspect, the memory of the ECU in which the contingent boot firmware is stored is essentially non-alterable memory of the ECU.

BRIEF DESCRIPTION OF THE DRAWINGS

The present invention will become more fully understood from the detailed description and the accompanying drawings, wherein.

DETAILED DESCRIPTION

Figure 1:
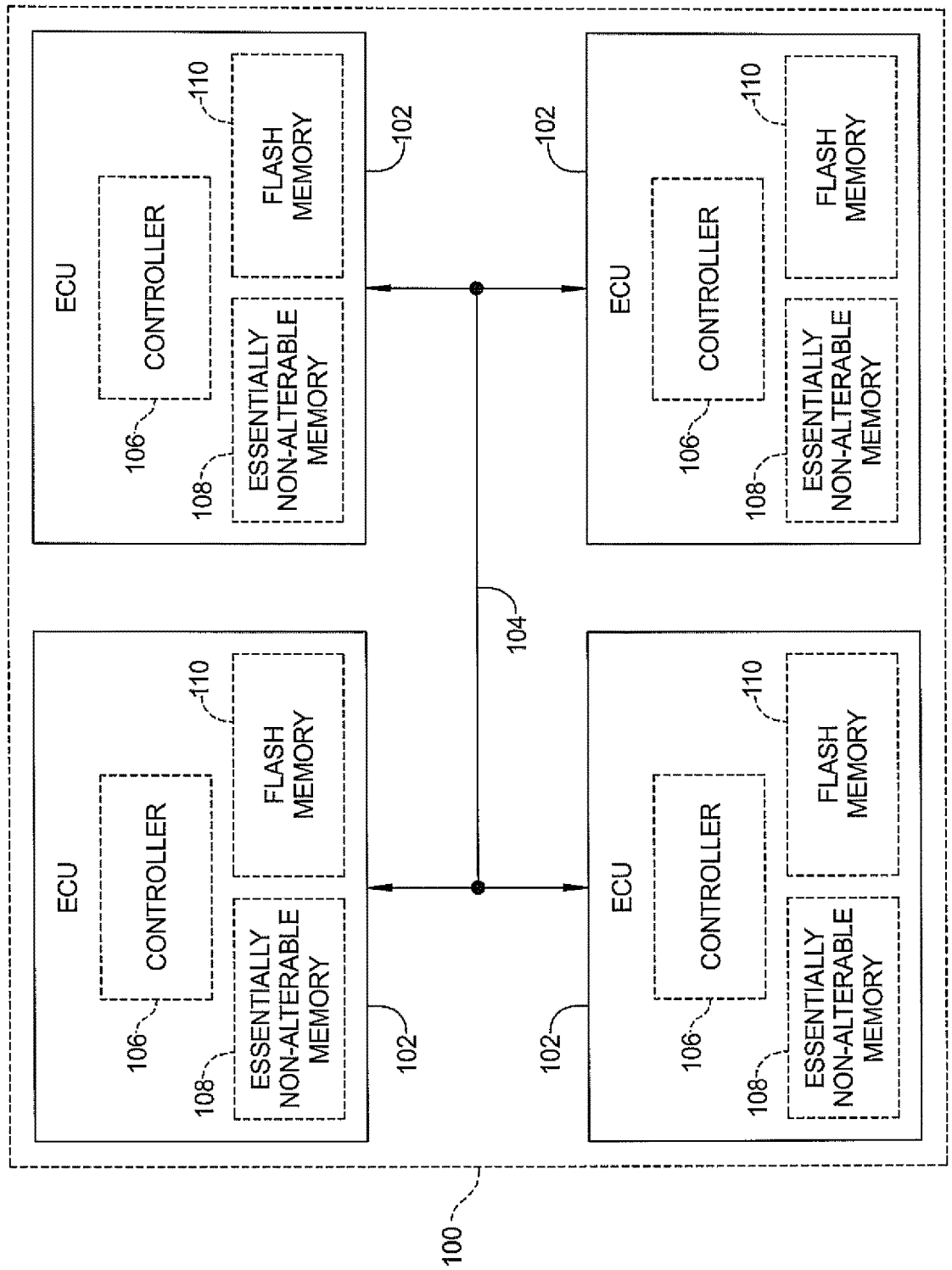
FIG. 1 is a simplified diagram of an automotive vehicle having a plurality of electronic control units in which at least one electronic control unit has a contingent boot and an authenticated boot performed in parallel in accordance with an aspect of the present disclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

FIG. 1 is a simplified diagram of a vehicle 100 (shown representatively by dashed box 100) having a plurality of ECU's 102 coupled to a CAN bus 104. Each ECU 102 illustratively has a controller 106 and flash memory 110, and typically also has essentially non-alterable memory 108. Essentially non-alterable memory is memory that either cannot be altered, such as programmable read only memory that can only be programmed once, or memory that while it can be altered (such as electrically erasable read only memory), is installed in ECU 102 in a manner that it cannot be altered by the normal flash-reprogramming process. While the hardware circuit topology shown in FIG. 1 is conventional, it should be understood that the boot process described below that is implemented in one or more ECU's 102 is not. It should be understood that controller 106 can be a micro-controller, a microprocessor, or any type of electronic device that executes software code.

Figure 2:
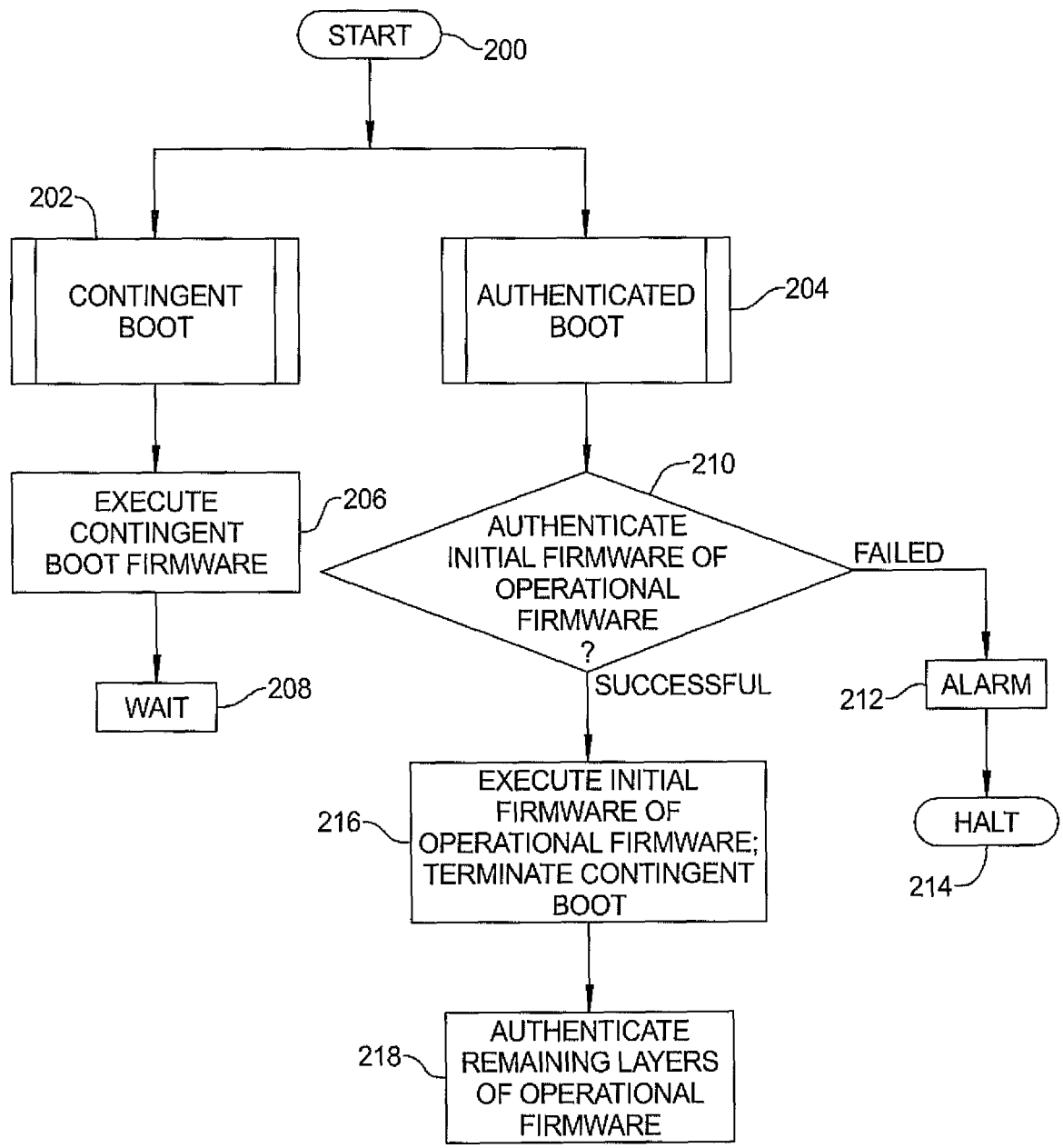
FIG. 2 is a flow chart of the boot process of FIG. 1 in which a contingent boot and authenticated boot are performed in parallel.

FIG. 2 is a flow chart showing a boot process having an authenticated boot and a contingent boot in accordance with an aspect of the present disclosure. The boot process of FIG. 2 is illustratively incorporated in any of ECU's 102 where the size of operational firmware for that ECU 102 is too large for it (or at least the initial firmware as discussed in more detail below) to be authenticated, such as by an authenticated boot, within the boot time specification for that ECU 102. To distinguish the firmware for a ECU 102 that is used by the ECU 102 for its normal operation from contingent boot firmware discussed below, the firmware that is used by an ECU for its normal operation is referred to herein as operational firmware. The operational firmware for ECU's in automotive vehicles typically includes executable code for the operating system and applications that the ECU's execute, parsable scripts and configuration and calibration files. This operational software is often divided into layers as discussed above.

The boot process starts at 200, illustratively, when vehicle 100 is started. The boot process proceeds to 202 where a contingent boot is performed, referred to herein as contingent boot 202, and also proceeds in parallel to 204 where an authenticated boot is performed, referred to herein as authenticated boot 204.

In performing contingent boot 202, at 206 the contingent boot firmware is executed, but without authentication of the contingent boot firmware. In an example, contingent boot software is provided and in an example, stored in flash memory 110. In another example, the contingent boot software is stored in essentially non-alterable memory 108. After the contingent boot firmware is executed, the contingent boot proceeds to 208 where it in effect waits for authenticated boot 204 to authenticate initial firmware of the operational firmware and execute the initial firmware, as discussed below. As used herein, the contingent boot firmware is firmware that has limited functionality, such as the minimum functionality that ECU 102 needs to meet its boot time specification, and in any case does not have the ability to flash the flash memory 110 of ECU 102, which in an aspect is due to a hardware configuration of the ECU. By way of example and not of limitation, the minimum functionality required for ECU 102 to meet its boot time specification is for ECU 102 to send a message within a predetermined period of time, the predetermined period of time as specified in the boot time specification, onto CAN bus 104 acknowledging that ECU 102 has started it's initialization process in response to vehicle 100 being started.

As discussed, the boot process includes performing authenticated boot 204 in parallel with contingent boot 202. In performing authenticated boot 204, at 210 initial firmware of the operational firmware for ECU 102 is authenticated. As used herein, the initial firmware is the code of the first layer of operational firmware executed by an ECU 102 when it is initialized, such as when it is powered up, and includes code for authentication of subsequent layers of the operational firmware for that ECU 102. By way of example and not of limitation, when the authentication utilizes public/private key cryptography, the initial firmware includes the cryptographic libraries necessary to access public certificates and code to authenticate the subsequent layers of the operational firmware using public/private key cryptography. In this regard, the initial firmware illustratively includes only the code necessary to load and perform the authentication of the subsequent layers of the operational firmware for that ECU 102.

If at 210 the authentication of the initial firmware failed, the boot process proceeds to 212 where it alarms that the authentication of the initial firmware failed and then proceeds to 214 where it halts. If at 210 the authentication of the initial software was successful, the authenticated boot proceeds to 216 where the initial firmware is executed and the contingent boot is terminated. The authenticated boot then proceeds to 218 where it authenticates the remaining layers of the operational firmware.

It should be understood that it is stated that a function is performed, such as by the boot process, ECU 102 executes software code to perform that function.

While the foregoing boot process that performs in parallel a contingent boot and authenticated boot has been described with reference to vehicle 100, it should be understood that it can be implemented in electronic control units used for applications other than vehicles.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of mitigating effects of delay due to time it takes an electronic control unit to perform an authenticated boot by which the electronic control unit authenticates operational firmware stored in flash memory of the electronic control unit and then executes the operational firmware only after successfully authenticating it, the method comprising:

having the electronic control unit perform a contingent boot in parallel with performing the authenticated boot upon initialization of the electronic control unit;

providing contingent boot firmware that does not have the capability to write to flash;

in having the electronic control unit perform the contingent boot, having the electronic control unit execute the contingent boot firmware having functionality that is limited to having the electronic control unit send within a predetermined period of time a message onto a data communication bus to which the electronic control unit is coupled; and in having the electronic control unit perform the authenticated boot, having the electronic control unit authenticate initial firmware of the operational firmware and upon successful authentication of the initial firmware, having the electronic control unit execute the initial firmware and terminate the contingent boot.

2. The method of claim 1 wherein executing the contingent boot firmware includes executing the contingent boot firmware without authenticating it.

3. The method of claim 1 wherein executing the initial firmware includes executing initial firmware that is code for a first layer of the operational firmware that includes only code necessary for authentication of subsequent layers of the operational firmware.

4. The method of claim 1 wherein providing the contingent boot software includes having it stored in the flash memory or in essentially non-alterable memory of the electronic control unit.

5. An automotive vehicle, comprising:
at least one electronic control unit configured to perform a contingent boot and also to perform an authenticated boot, the electronic control unit having flash memory, the flash memory having therein operational firmware;

the electronic control unit configured to perform the contingent boot and the authenticated boot in parallel when the electronic control unit is initialized;

the electronic control unit configured to perform the contingent boot by executing contingent boot firmware stored in memory of the electronic control unit where the contingent boot firmware does not have the capability to write to flash and has functionality that is limited to the electronic control unit sending within a predetermined period of time a message onto a data communication bus to which the electronic control unit is coupled; and the electronic control unit configured to perform the authenticated boot by authenticating initial firmware of the operational firmware and upon successful authentication of the initial firmware, the electronic control unit configured to execute the initial firmware and terminate the contingent boot.

6. The automotive vehicle of claim 5 wherein the electronic control is configured to execute the contingent boot firmware without authenticating the contingent boot firmware.

7. The automotive vehicle of claim 5 wherein the initial firmware is code for a first layer of the operational firmware that includes only code necessary for loading and authentication of subsequent layers of the operational firmware.

8. The automotive vehicle of claim 5 wherein the contingent boot software is stored in the flash memory or in essentially non-alterable memory of the electronic control unit.

* * * * *